United States Patent
Yamaguchi et al.

(10) Patent No.: US 8,322,480 B2
(45) Date of Patent: Dec. 4, 2012

(54) CONTROL DEVICE AND CONTROL METHOD FOR BELT-TYPE CONTINUOUSLY VARIABLE TRANSMISSION

(75) Inventors: Kenichi Yamaguchi, Chiryu (JP); Masahiro Tawara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 155 days.

(21) Appl. No.: 12/673,955

(22) PCT Filed: Mar. 30, 2009

(86) PCT No.: PCT/IB2009/005133
§ 371 (c)(1), (2), (4) Date: Feb. 17, 2010

(87) PCT Pub. No.: WO2009/122261
PCT Pub. Date: Oct. 8, 2009

(65) Prior Publication Data
US 2011/0034279 A1    Feb. 10, 2011

(30) Foreign Application Priority Data
Mar. 31, 2008    (JP) ................................. 2008-089988

(51) Int. Cl.
*F16H 61/02*    (2006.01)
(52) U.S. Cl. ...................................................... 180/233
(58) Field of Classification Search .................... 180/233
See application file for complete search history.

(56) References Cited

U.S. PATENT DOCUMENTS
2008/0230294 A1*    9/2008    Smith et al. ................... 180/233

FOREIGN PATENT DOCUMENTS

| EP | 0 365 276 A1 | 4/1990 |
|---|---|---|
| EP | 2 090 454 A2 | 8/2009 |
| JP | A-64-30846 | 2/1989 |
| JP | A-2001-108082 | 4/2001 |
| JP | A-2002-340173 | 11/2002 |
| JP | A-2006-220259 | 8/2006 |
| JP | A-2007-177943 | 7/2007 |
| JP | A-2008-30569 | 2/2008 |

OTHER PUBLICATIONS

Feb. 25, 2010 Office Action issued in Japanese Patent Application No. 2008-089988 (with partial translation).
International Search Report issued on Aug. 18, 2009 issued in International Application No. PCT/IB2009/005133.
Written Opinion of the International Search Authority issued on Aug. 18, 2009 in International Application No. PCT/IB2009/005133.
Sep. 23, 2011 Office Action issued in European Application No. 09 728 568.8.

* cited by examiner

*Primary Examiner* — Kevin Hurley
(74) *Attorney, Agent, or Firm* — Oliff & Berridge, PLC (57) ABSTRACT

A belt-type continuously variable transmission changes winding radii of a belt that is wound around an input-side and an output-side pulley to shift speeds. The belt-type continuously variable transmission is mounted on a vehicle that switches between two-wheel drive is transmitted only to front wheels and four-wheel drive. An electronic control unit that controls the belt-type continuously variable transmission adjusts the belt clamping pressure of each pulley as torque is distributed to the rear wheels, to suppress muffled noise due to resonance of vehicle components with belt span vibrations.

12 Claims, 4 Drawing Sheets

CONTROL DEVICE AND CONTROL METHOD FOR BELT-TYPE CONTINUOUSLY VARIABLE TRANSMISSION

INCORPORATION BY REFERENCE

The disclosure of Japanese Patent Application No. 2008-089988 filed on Mar. 31, 2008, including the specification, drawings and abstract is incorporated herein by reference in its entirety.

BACKGROUND OF THE INVENTION

1. Field of the Invention

The invention relates to a control device and control method for a belt-type continuously variable transmission that is mounted on a vehicle equipped with four-wheel drive.

2. Description of the Related Art

In recent years, vehicle transmissions increasingly employ continuously variable transmissions (CVT), which are able to steplessly change speed ratios. Currently, the predominant vehicle-mounted continuously variable transmission is a belt-type continuously variable transmission that is formed of a combination of a pair of variable-diameter pulleys and a belt wound around those pulleys. The belt-type continuously variable transmission changes the ratio between belt winding radii of the two input-side and output-side pulleys (pulley ratio) to shift speeds.

In the thus configured belt-type continuously variable transmission, the belt transmits torque while slightly slipping on the pulleys. Motion of the belt causes a slip due to μ-V (friction coefficient-speed) characteristics, so energy that vibrates the belt is constantly generated when the continuously variable transmission is in operation. On the other hand, the belt wound around the two pulleys has free belt spans that are not in contact with either pulley (note that portions wound on the pulleys form a circular arc shape, and portions between the pulleys, forming a substantially straight shape, are termed belt spans). Thus, belt span vibrations occur in the belt spans during operation of the continuously variable transmission.

Japanese Patent Application Publication No. 2001-108082 (JP-A-2001-108082) describes an invention that focuses on such belt span vibrations in the belt-type continuously variable transmission. In the invention described in JP-A-2001-108082, belt slip due to insufficient belt clamping pressure is detected if the vibrations of the belt spans increase, and, when it is detected, belt clamping pressures of the pulleys are increased to suppress belt slip.

The frequency of the above described vibrations of the belt spans may coincide with the natural frequency of certain vehicle components to cause resonance. This may generate muffled noise that makes a vehicle occupant feel uncomfortable. The above muffled noise is particularly remarkable in four-wheel drive vehicles as described below.

Certain four-wheel drive vehicles are able to change the torque distribution ratio between the front and rear wheels depending on a situation. Some of these four-wheel drive vehicles may also switch between two-wheel drive and four-wheel drive depending on a situation. In two-wheel drive, the torque is distributed only to main driving wheels (for example, front wheels). In four-wheel drive, torque is distributed to both the main driving wheels and auxiliary driving wheels (for example, rear wheels). In these four-wheel drive vehicles, the auxiliary driving wheels are drivably connected to the transmission in four-wheel drive, and the auxiliary driving wheels are decoupled from the transmission in two-wheel drive. Thus, when switching from two-wheel drive to four-wheel drive, vibrations of the belt spans in the belt-type continuously variable transmission propagate over a wider range. Thus, in four-wheel drive, belt span vibrations propagate also to components that rarely experience belt span vibrations in two-wheel drive. Hence, even if no component resonates with belt span vibrations of the belt spans during the two-wheel drive, resonance may occur as the belt span vibrations propagate over a wider range during four-wheel drive.

To avoid the above resonance phenomenon, it is necessary to design components, provided within the range over which belt span vibrations propagate, so that the natural frequency of each component does not coincide with the frequency of the belt span vibrations. However, it is difficult to design all the components located within the range over which belt span vibrations propagate. Moreover, it is further difficult to apply the above design to all the components located within the wider range over which belt span vibrations propagate during the four-wheel drive.

Note that most of four-wheel drive vehicles that are able to switch between two-wheel drive and four-wheel drive use a two-wheel drive vehicle as a base for development. Here, even when the base two-wheel drive vehicle is designed so as not to resonate with the vibrations of the belt spans in the belt-type continuously variable transmission, some components may resonate with the belt span vibrations when switched to the four-wheel drive. In this case, to eliminate components that cause resonance, it is necessary to largely change the design from the base vehicle when the four-wheel drive function is added. Thus, actually, prevention of muffled noise during the four-wheel drive requires a compromise to some extent.

In addition, even in full-time four-wheel drive vehicles that regularly run in four-wheel drive as well but varies torque distributed between the front and rear wheels, belt span vibrations may propagate to various portions of the vehicle varies as the torque distribution changes. For example, even if a component that hardly receives the influence of the belt span vibrations when torque distribution ratio of the rear wheels is small, the component may receive non-negligible influence from the belt span vibrations as the torque distribution ratio of the rear wheels increases. Thus, in full-time four-wheel drive vehicles that vary torque distribution between the front and rear wheels, the same problem may arise.

SUMMARY OF THE INVENTION

The invention provides a control device and control method for a belt-type continuously variable transmission, which are able to effectively suppress muffled noise due to resonance with vibrations of the belt spans of the belt in a belt-type continuously variable transmission.

An aspect of the invention provides a control device for a belt-type continuously variable transmission that is mounted on a four-wheel drive vehicle, which variably distributes torque between front and rear wheels, and that changes the winding radius of a belt, wound around an input-side pulley and output-side pulley, at each pulley to shift speeds. The control device includes a clamping pressure adjusting device that adjusts belt clamping pressures of the pulleys based on the torque distributed between the front and rear wheels.

In addition, another aspect of the invention provides a control method for a belt-type continuously variable transmission that is mounted on a four-wheel drive vehicle and that changes the winding radius of a belt, wound around an input-side pulley and an output-side pulley, at each pulley to shift speeds. The control method includes increasing or decreasing the belt clamping pressures based on the distribution of torque between the front and rear wheels.

As the torque distributed between the front and rear wheels changes, the range over which the vibrations of the belt spans in the belt-type continuously variable transmission propagate also changes. Thus, the belt span vibrations may propagate to vehicle components that have previously not experienced the belt span vibrations, or the strength of belt span vibrations that propagate to vehicle components changes. As a result, the belt span vibrations influence components that have previously been free from the belt span vibrations. This changes the appropriate frequency of the belt span vibrations, at which resonance with the components may be sufficiently suppressed.

Thus, with the above described control device and control method, the belt clamping pressures of the pulleys are adjusted as the torque distribution between the front and rear wheels changes. If the belt clamping pressures of the pulleys are changed, tension of the belt varies. This makes it possible to change the frequency of belt span vibrations. Thus, even if the frequency range of the belt span vibrations, in which resonance with belt span vibrations can be sufficiently suppressed, varies as the torque distribution between the front and rear wheels changes, the frequency of belt span vibrations may be actually varied in response to the variation in the above range. Thus, it is possible to effectively suppress muffled noise due to resonance with the vibrations of the belt spans in the belt-type continuously variable transmission.

In the control device for a belt-type continuously variable transmission, the four-wheel drive vehicle may switch, between operating in a two-wheel drive mode, in which torque is distributed only to main driving wheels, and operating in a four-wheel drive, in which torque is distributed to both the main driving wheels and auxiliary driving wheels, and the clamping pressure adjusting device may adjust the belt clamping pressures as torque is distributed to the auxiliary driving wheels.

As the above described four-wheel drive vehicle switches from two-wheel drive to four-wheel drive, that is, as torque is distributed to the auxiliary driving wheels, the vibrations of the belt spans in the belt-type continuously variable transmission propagate over a further wider range. As a result, the range of vehicle components that receive the influence from the belt span vibrations largely changes. Thus, as torque is distributed to the auxiliary driving wheels, the belt span vibrations also propagate to vehicle components that have previously been free from the belt span vibrations. This may cause the vehicle components to resonate with the belt span vibrations as soon as torque is distributed to the auxiliary driving wheels. In that respect, in the above described control device, the belt clamping pressures are adjusted as torque is distributed to the auxiliary driving wheels. Thus, it is possible to suitably suppress, a cause of muffled noise, that is, resonance of a vehicle component due to belt span vibrations.

In the control device for a belt-type continuously variable transmission, the clamping pressure adjusting device may determine the amount of adjustment in belt clamping pressure based on the magnitude of the torque transmitted to the auxiliary driving wheels.

The condition in which belt span vibrations propagate to vehicle components varies depending on the magnitude of torque distributed to the auxiliary driving wheels, so the range of components that may resonate with belt span vibrations also varies depending on the magnitude of torque distributed to the auxiliary driving wheels. Thus, an appropriate belt span vibration frequency that can sufficiently suppress resonance of a vehicle component may also vary depending on the magnitude of torque distributed to the auxiliary driving wheels. In that respect, with the above described control device, the amount of adjustment in belt clamping pressure is determined based on the magnitude of torque distributed to the auxiliary driving wheels. Thus, it is possible to further adequately suppress resonance of a vehicle component due to belt span vibrations.

In the control device for a belt-type continuously variable transmission, the clamping pressure adjusting device may determine an amount of adjustment in belt clamping pressure based on an input torque of an electronically controlled coupling, which is able to vary the torque distribution ratio to the auxiliary driving wheels, and a speed ratio of the belt-type continuously variable transmission.

As described above, an amount of adjustment in belt clamping pressure is determined on the basis of a magnitude of torque distributed to the auxiliary driving wheels. Thus, it is possible to further adequately suppress resonance of a vehicle component due to belt span vibrations. At this time, the magnitude of torque distributed to the auxiliary driving wheels, unless directly detected, may be substantially estimated based on the input torque of the electronically controlled coupling and a speed ratio of the belt-type continuously variable transmission. Thus, with the above described control device, when an amount of adjustment in belt clamping pressure is determined based on the input torque and speed ratio as well, it is possible to further adequately suppress resonance of a vehicle component due to belt span vibrations.

In the control device for a belt-type continuously variable transmission, the clamping pressure adjusting increases the belt clamping pressures.

Increasing the belt clamping pressures not only changes the frequency of vibrations of the belt spans but also suppresses a slip of the belt on the pulleys to thereby make it possible to reduce the magnitude of belt span vibrations. Thus, with the above described control device, the belt clamping pressures is adjusted by increasing the belt clamping pressures, so it is possible to further effectively suppress resonance of a vehicle component due to belt span vibrations and, by extension, occurrence of muffled noise.

In the control device for a belt-type continuously variable transmission, the clamping pressure adjusting device may adjust the belt clamping pressures by decreasing the belt clamping pressures.

When the belt clamping pressures are reduced within a range in which the belt is not likely to slip, the frequency of vibrations of the belt spans varies to thereby make it possible to reduce the magnitude of belt span vibrations. Thus, with the above described control device, the belt clamping pressures is adjusted by decreasing the belt clamping pressures, so it is possible to further effectively suppress resonance of a vehicle component due to belt span vibrations and, by extension, occurrence of muffled noise.

In the control device for a belt-type continuously variable transmission, the clamping pressure adjusting device may determine the distribution of torque between the front and rear wheels based on a detected steering angle.

In certain four-wheel drive vehicles, if any one of the four wheels slip and, therefore, differential motion between the right and left wheels excessively increases over a certain amount, torque distributed to the wheels is changed to maintain transmission of driving force to a road surface. On the other hand, the amount of differential motion between the right and left wheels also increases when the steering angle increases over a certain amount as well. In this case as well, torque distributed to the wheels is changed. Thus, there is a correlation between a steering angle and the distribution of torque, and it is possible to estimate the distribution of torque between the wheels from the steering angle. Thus, as in the above configuration, based on the detected steering angle as well, it is possible to determine distribution of torque between the front and rear wheels.

In the control device for a belt-type continuously variable transmission, the four-wheel drive vehicle may switch between operating in a two-wheel drive mode, in which torque is distributed only to main driving wheels, and operating in a four-wheel drive, in which torque is distributed to both the main driving wheels and auxiliary driving wheels, and the clamping pressure adjusting device may estimate the distribution of torque between the front and rear wheels based on the operating status of a switch for setting the four-wheel drive vehicle to operate in four-wheel drive mode.

In some of the four-wheel drive vehicles, the running mode of the vehicle may be fixed to four-wheel drive by the operation of a switch. In such four-wheel drive vehicles, it is possible to substantially determine the distribution of torque between the front and rear wheels based on an operating status of the fixed switch.

In the control device for a belt-type continuously variable transmission, only when the speed ratio of the belt-type continuously variable transmission falls within a prescribed range, the clamping pressure adjusting device may adjust the belt clamping pressures based on the torque distribution between the front and rear wheels.

When the pulley ratio is changed in order to vary the speed ratio of the belt-type continuously variable transmission, the length of the free spans of the belt also change. Thus, the frequency of belt span vibrations also varies. Therefore, resonance of a vehicle component due to belt span vibrations may or may not occur depending on the speed ratio of the belt-type continuously variable transmission. With the above described control device, the belt clamping pressures are adjusted based on the torque distribution between the front and rear wheels only if the speed ratio of the belt-type continuously variable transmission falls within the prescribed range. Thus, the belt clamping pressures may be adjusted only when the speed ratio of the belt-type continuously variable transmission falls within a range in which vehicle components resonate due to belt span vibrations. Hence, it is possible to avoid unnecessary adjustment of the belt clamping pressures to further effectively suppress resonance of a vehicle component due to belt span vibrations.

In the control device for a belt-type continuously variable transmission, the clamping pressure adjusting device may adjust the belt clamping pressures based on the torque distributed between the front and rear wheels only when a predetermined specific speed is selected in a sequential-shift mode, in which the speed ratio of the belt-type continuously variable transmission is fixed to a speed ratio corresponding to a speed selected through a driver's operation.

When the sequential mode is employed as a speed shift mode of the vehicle, in such a sequential mode, the speed ratio of the belt-type continuously variable transmission is set at the speed ratio corresponding to a speed selected through a driver's operation. In this case, because the frequency of belt span vibrations varies depending on a speed ratio of the belt-type continuously variable transmission as described above, a vehicle component may resonate due to belt span vibrations only in a specific speed in the sequential mode. Here, with the above described control device, the belt clamping pressures are adjusted based on the torque distribution between the front and rear wheels only when, in a sequential mode, a predetermined speed is selected. Thus, the belt clamping pressures may be adjusted only when the speed is set at a speed in which a vehicle component resonates due to belt span vibrations. Hence, it is possible to avoid unnecessary adjustment of the belt clamping pressures to further effectively suppress resonance of a vehicle component due to belt span vibrations.

Furthermore, the clamping pressure adjusting device may adjust the belt clamping pressures by increasing or decreasing the belt clamping pressures so that vibrational frequency of belt span vibrations of the belt falls within a range that excludes a predetermined resonance frequency of a vehicle component.

With the above described control device, the vibrational frequency of belt span vibrations of the belt avoids a predetermined resonance frequency of certain vehicle components, thus making it possible to avoid resonance and, by extension, effectively suppress muffled noise in the vehicle.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, a specific control device for a belt-type continuously variable transmission according to a first embodiment of the invention will be described in greater detail with reference to FIG. 1 and FIG. 2. Note that the control device according to the present embodiment of the invention is applied to the belt-type continuously variable transmission mounted on a part-time four-wheel drive vehicle in which the front wheels serve as the main drive wheels to which torque is primarily transmitted and the rear wheels serve as the auxiliary wheels to which torque is transmitted only when necessary.

Figure 1:
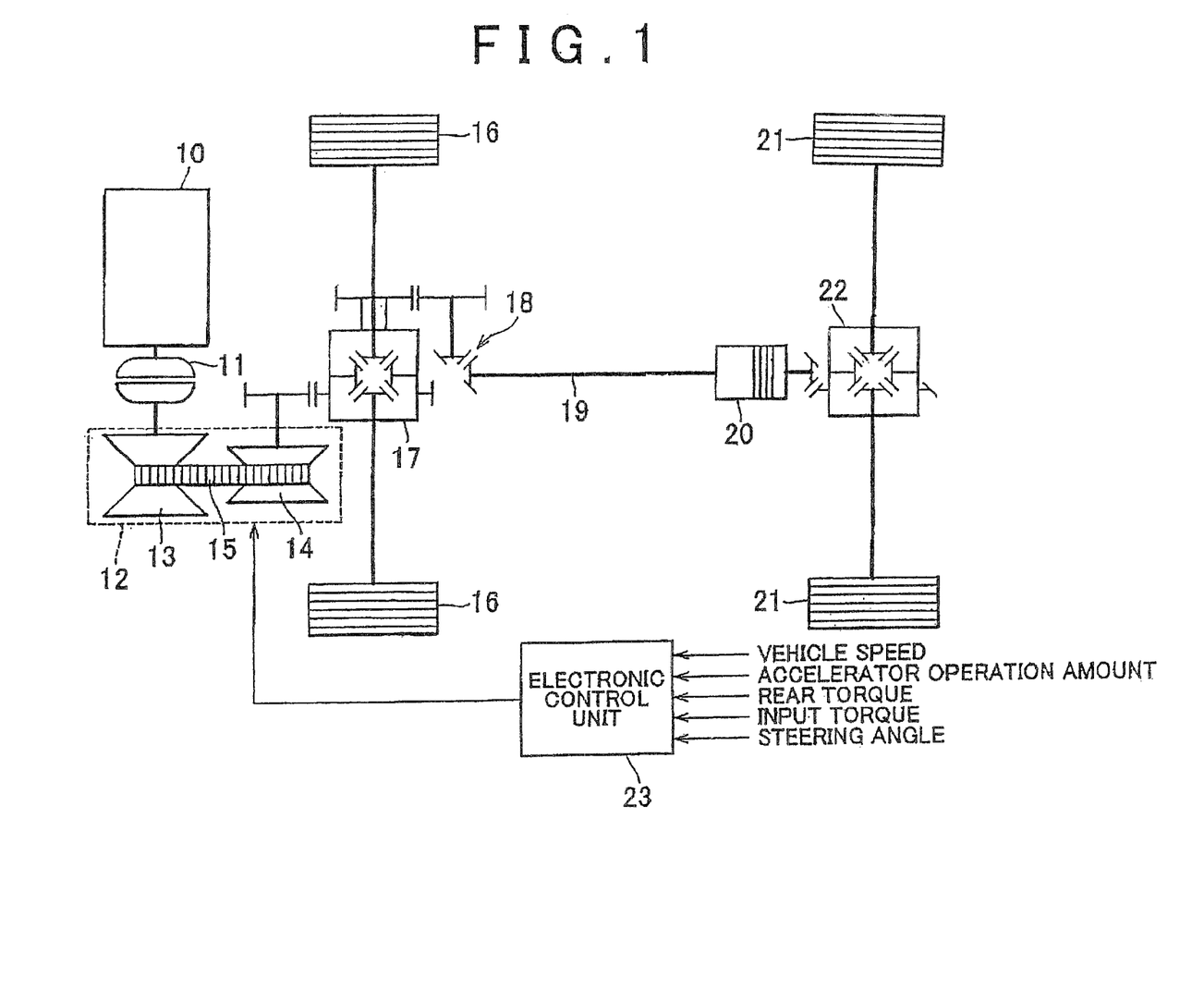
FIG. 1 is a view that schematically shows the configuration of a powertrain of a four-wheel drive vehicle to which a first embodiment of the invention is applied.

FIG. 1 shows the configuration of a powertrain of the four-wheel drive vehicle to which the control device for a belt-type continuously variable transmission according to the present embodiment is applied. As shown in the drawing, the four-wheel drive vehicle has an engine 10 as a driving source, and the engine 10 is connected to a belt-type continuously variable transmission 12 via a torque converter 11. The belt-type continuously variable transmission 12 includes a pair of variable diameter pulleys, that is, an input-side primary pulley 13 and an output-side secondary pulley 14, and a belt 15 wound around the pulleys. The belt-type continuously variable transmission 12 changes the ratio between the belt winding radii of the pulleys (pulley ratio) to shift speeds. The belt winding radius of each pulley in the belt-type continuously variable transmission 12 is changed by adjusting the hydraulic pressure (sheave pressure) applied to the pulleys.

The output-side of the belt-type continuously variable transmission 12 is coupled to a front differential 17 that allows differential motion of right and left wheels 16. The front differential 17 is coupled to a propeller shaft 19 via a transfer 18, which serves as a diverter. Then, the propeller shaft 19 is connected to a rear differential 22 that allows differential motion of right and left rear wheels 21 via an electronically controlled coupling 20 that changes the torque distribution between the front wheels 16 and the rear wheels 21.

In addition, the four-wheel drive vehicle is equipped with an electronic control unit 23 that controls the belt-type continuously variable transmission 12. The electronic control unit 23 includes a central processing unit (CPU) that executes various processes related to control over the belt-type continuously variable transmission 12, a read-only memory (ROM) that stores a control program and data, a random access memory (RAM) that temporarily stores process results of the CPU and input and output ports (I/O ports) for exchanging signals with external instruments. Sensors are provided at various portions in the vehicle to detect the vehicle speed, the accelerator operation amount, the amount of torque transmitted toward the rear wheels 21 through the electronically controlled coupling 20 (rear torque), the input torque to the electronically controlled coupling 20, the steering angle of the vehicle, and the like. Signals detected by these sensors are input to the input port of the electronic control unit 23. Then, when the vehicle is in motion, the electronic control unit 23 calculates the optimal speed ratio in the current running state based on the vehicle speed and the accelerator operation amount, and then adjusts the sheave pressures applied to the pulleys of the belt-type continuously variable transmission 12 to obtain the calculated speed ratio.

In the belt-type continuously variable transmission 12 mounted on the four-wheel drive vehicle, when the vehicle is moving, spans (which are not in contact with any of the pulleys; note that portions wound on the pulleys form a circular arc shape, and portions between the pulleys, forming a substantially straight shape, are termed as belt spans) of the belt 15 wound around both pulleys vibrate because of a slight slip between the belt and the pulleys. Vibrations (belt span vibrations) of the belt spans propagate to various portions of the vehicle through, for example, a torque transmission path from the engine 10 to the driving wheels.

The frequency f of belt span vibrations may be calculated using the following mathematical expression (1). In the mathematical expression (1), "n" denotes any integer, "L" denotes the length of the belt span portion, "T" denotes the tension of the belt 15, and "ρ" denotes a linear density of the belt 15. Note that the length L varies with a variation in pulley ratio of the belt-type continuously variable transmission 12, that is, a variation in speed ratio, and the tension T of the belt 15 varies with belt clamping pressures applied to the pulleys.

$$f = \frac{n}{2L}\sqrt{\frac{T}{\rho}} \quad (1)$$

On the other hand, if the natural frequency of a vehicle component coincides with the frequency of the belt span vibrations, that is, if the natural frequency coincides with "m/n" (m, n: any integer) times the frequency of the belt span vibrations, that vehicle component will resonate and cause a muffled noise. Here, in the above four-wheel drive vehicle, torque distributed between the front and rear wheels is changed by the electronically controlled coupling 20 to change the distribution of engine torque between the front and rear wheels 21, and, as a result, the condition in which belt span vibrations propagate changes to vary the range of components that receive the influence from belt span vibrations. For example, even components that hardly experience belt span vibrations when no torque is being transmitted to the rear wheels 21 may receive nonnegligible influence from belt span vibrations as torque is transmitted to the rear wheels 21. Thus, even if the frequency f and/or magnitude of belt span vibrations remain unchanged, the condition in which a vehicle component resonates due to belt span vibrations may change when the torque distributed between the front and rear wheels changes.

Then, in the present embodiment, whether torque is being distributed to the rear wheels 21 is monitored, and belt clamping pressures applied to the pulleys of the belt-type continuously variable transmission 12 are adjusted based on the detected torque distribution to vary the frequency f of belt span vibrations. Thus, resonance of a vehicle component due to belt span vibrations is suppressed. At this time, the belt clamping pressures are adjusted by increasing sheave pressures applied to the pulleys of the belt-type continuously variable transmission 12. The sheave pressures of both pulleys are increased simultaneously to increase belt clamping pressures while maintaining the established pulley ratio (speed ratio) at constant.

Note that in the four-wheel drive vehicle to which the present embodiment is applied, no component resonates with belt span vibrations in two-wheel drive in which only the front wheels 16 are used. Then, when starting four-wheel drive, belt span vibrations propagate over a wider belt span vibrations propagating range. Some components may resonate with belt span vibrations as the belt span vibrations propagating range expands. For the above reason, in the present embodiment, belt clamping pressures are adjusted as torque is transmitted to the rear wheels 21.

Furthermore, when starting four-wheel drive, the belt clamping pressure at each pulley is adjusted within the range in which the belt clamping pressure is adjustable so that the frequency f of belt span vibrations falls outside resonance frequencies (natural frequencies and frequencies that are "n/m" times the natural frequencies) of all the vehicle components that receive the influence of belt span vibrations when torque is transmitted to the rear wheels 21. The range in which each belt clamping pressure is adjustable is a minimum belt clamping pressure at which slip of the belt 15 may be prevented and a belt clamping pressure that is obtained with a maximum settable sheave pressure. Note that the range of vehicle components that receive the influence from belt span vibrations varies with the magnitude of torque transmitted to the rear wheels 21 (rear torque), so the optimal frequency f of belt span vibrations at which resonance of a vehicle component is avoidable varies with the magnitude of the rear torque. Here, amounts, by which sheave pressures are increased, for allowing the frequency f of belt span vibrations to vary to an optimal value at which resonance is avoidable are empirically obtained beforehand by magnitudes of the rear torque. Then, a map of the relationship between the amount of increase in sheave pressure and the rear torque is stored in the ROM of the electronic control unit 23. Then, when the electronic control unit 23 adjusts the belt clamping pressures, the electronic control unit 23 uses the map to acquire the optimal amount of increase in sheave pressure that corresponds to a given magnitude of the rear torque, and then adjusts the sheave pressures in accordance with the acquired amount of increase in sheave pressure.

In addition, in the four-wheel drive vehicle to which the present embodiment is applied when a tire does not slip, for example, during four wheel driver operation, torque distributed between the front and rear wheels is constant, and a linear relationship holds between an output torque of the belt-type continuously variable transmission 12 and the rear torque. Then, in the present embodiment, the detected output torque of the belt-type continuously variable transmission 12 (for example, torque of the secondary pulley 14) is used as an index value of the magnitude of the rear torque in adjusting the sheave pressures. That is, actually, the process map stores the relationship between the output torque of the belt-type continuously variable transmission 12 and the optimal amount of increase in sheave pressure at that output torque.

Figure 2:
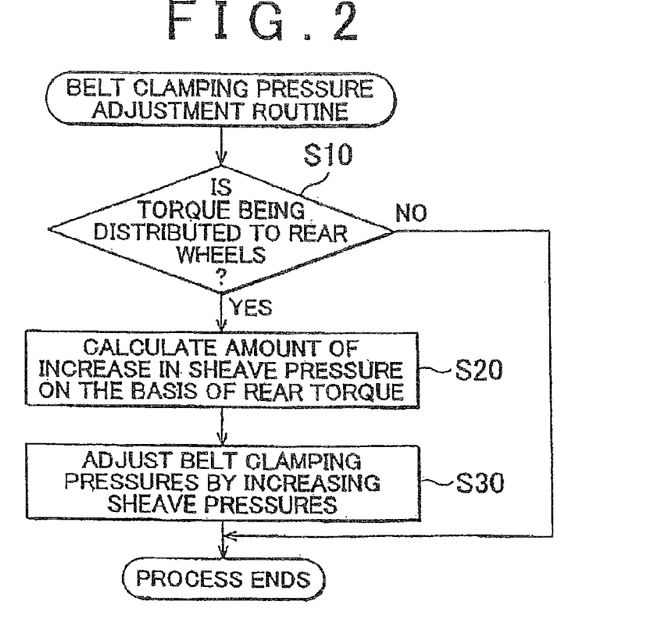
FIG. 2 is a flowchart of a belt clamping pressure adjustment process according to the first embodiment.

FIG. 2 shows a flowchart of a "belt clamping pressure adjustment process" applied to the thus configured present embodiment. The process is periodically executed by the electronic control unit 23 while the vehicle is in motion.

When the process starts, in step S10, the electronic control unit 23 determines, based on the detected rear torque, whether torque is being distributed to the rear wheels 21, that is, whether the torque distribution ratio of the rear wheels 21 is "0". Specifically, determination of whether torque is being distributed to the rear wheels 21 is made as to whether the rear torque is "0".

If no torque is being distributed to the rear wheels 21 (S10: NO), the electronic control unit 23 ends the current process. However, if torque is transmitted to the rear wheels 21 (S10: YES), the electronic control unit 23 uses the map stored in the ROM to calculate the amount by which to increase the sheave pressure based on the magnitude of the rear torque at that time, in step S20. Then, in step S30, the electronic control unit 23 increases the sheave pressures to increase the belt clamping pressures and then ends the process of the current process.

As described above, in the present embodiment, the belt clamping pressures are adjusted as torque is distributed to the rear wheels 21, thus changing the frequency of belt span vibrations. Therefore, even if some components may resonate with belt span vibrations as torque is distributed to the rear wheels 21 to expand the belt span vibration propagating range, it is possible to avoid resonance and prevent muffled noise. Note that, in the present embodiment, the electronic control unit 23 may be regarded as a clamping pressure adjusting device.

With the above described control device for a belt-type continuously variable transmission according to the present embodiment, the following advantageous effects may be obtained.

(1) In the present embodiment, the electronic control unit 23 adjusts the belt clamping pressure for each pulley of the belt-type continuously variable transmission 12 based on the torque distributed between the front and rear wheels. As the torque distributed between the front and rear wheels changes, the range over which vibrations of the belt spans in the belt-type continuously variable transmission 12 propagate also changes. Thus, belt span vibrations may propagate to vehicle components that have not previously experienced belt span vibrations, or the strength of belt span vibrations that propagate to the vehicle components changes. As a result, belt span vibrations influence components that have previously been free from belt span vibrations. This changes the appropriate frequency of belt span vibrations, at which resonance with the components can be sufficiently suppressed. In the present embodiment, the belt clamping pressures of the pulleys are adjusted as the torque distributed between the front and rear wheels varies. If the belt clamping pressure of each pulley is changed, the tension of the belt 15 varies and thereby changes the frequency f of the belt span vibration. Thus, even if the range of belt span vibration frequency, at which resonance with the belt span vibrations can be sufficiently suppressed, varies as the torque distributed between the front and rear wheels varies, the frequency of belt span vibrations may be actually changed in response to the variation in the above range. Thus, according to the present embodiment, it is possible to effectively suppress muffled noise due to resonance with vibrations of the belt spans in the belt-type continuously variable transmission 12.

(2) In the present embodiment, the electronic control unit 23 adjusts the belt clamping pressures as torque is distributed to the rear wheels 21. When the drive mode is switched from two-wheel drive to four-wheel drive to distribute torque to the rear wheels 21, vibrations of the belt spans in the belt-type continuously variable transmission 12 propagate over a wider range of components. Thus, belt span vibrations also propagate to components that have previously been free from belt span vibrations. This may cause the components to resonate with belt span vibrations as soon as torque is distributed to the rear wheels 21. Accordingly, in the present embodiment, the belt clamping pressures are adjusted as torque is distributed to the rear wheels 21. Thus, it is possible to suitably suppress a cause of muffled noise, that is, resonance of a vehicle component due to belt span vibrations.

(3) In the present embodiment, the electronic control unit 23 increases the belt clamping pressures. The frequency f of belt span vibrations may be adjusted by either increasing or decreasing the belt clamping pressures. However, increasing the belt clamping pressures not only changes the frequency of belt span vibrations of the belt spans but also suppresses a slip of the belt on the pulleys to thereby make it possible to reduce the magnitude of belt span vibrations. Thus, adjusting the belt clamping pressure is carried out not by decreasing the belt clamping pressures but by increasing the belt clamping pressures, so it is possible to further effectively suppress resonance of a vehicle component due to belt span vibrations and, by extension, occurrence of muffled noise.

(4) In the present embodiment, the electronic control unit 23 determines the amount by which to increase the sheave pressure in adjusting the belt clamping pressures and, by extension, the amount of adjustment in belt clamping pressure based on a magnitude of toque transmitted to the rear wheels 21 (rear torque), the torque being acquired from the output torque of the belt-type continuously variable transmission 12. The condition in which belt span vibrations propagate to vehicle components changes depending on the magnitude of the rear torque, so the range of components that may resonate with belt span vibrations also varies depending on the magnitude of the rear torque. Thus, an appropriate belt span vibration frequency that can sufficiently suppress resonance of a vehicle component also varies depending on the magnitude of the rear torque. In that respect, in the present embodiment, an amount of adjustment in belt clamping pressure is determined based on the magnitude of the rear torque. Thus, it is possible to further adequately suppress resonance of a vehicle component due to belt span vibrations.

Next, a specific control device for a belt-type continuously variable transmission according to a second embodiment of the invention will be described focusing on the difference from the above described embodiment with further reference to FIG. 3. Note that in the present embodiment and the following embodiments, like reference numerals denote like components to those of the first embodiment, and the detailed description thereof is omitted.

In some of the above described four-wheel drive vehicles, when any one of the right and left wheels 16 slips in two-wheel drive in which only the front wheels 16 are used and then the amount of differential motion between the right and left wheels 16 exceeds a predetermined value, torque is transmitted to the rear wheels 21 to maintain transmission of driving force to a road surface. On the other hand, the amount of differential motion between the right and left wheels 16 also increases when the steering angle of the vehicle increases as well. In this case as well, torque is distributed to the rear wheels 21. In this way, there is a correlation between the steering angle of the vehicle and the distribution of torque between the front and rear wheels. Thus, the torque distribution may be substantially acquired based on a steering angle. Then, in the present embodiment, the status of torque distributed between the front and rear wheels is determined based on the detected steering angle. When the steering angle is larger than or equal to a threshold steering angle, the belt clamping pressures of the belt-type continuously variable transmission 12 are adjusted, so that torque is distributed to the rear wheels 21.

Figure 3:
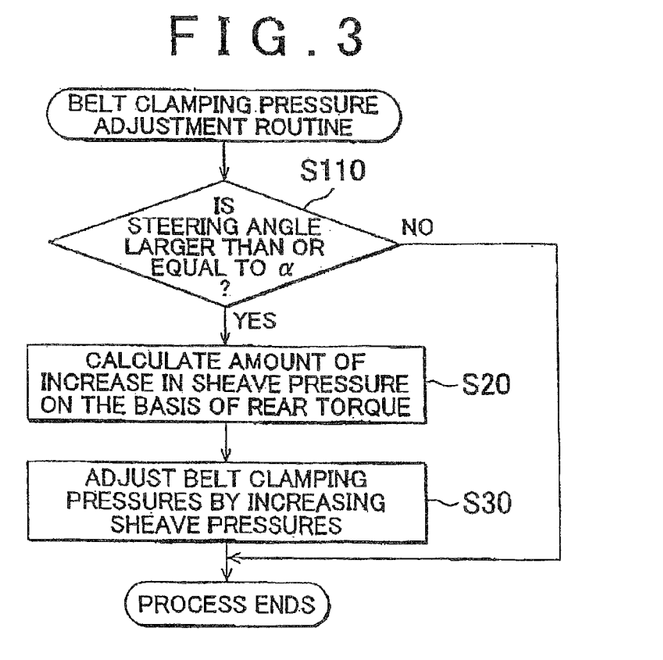
FIG. 3 is a flowchart of a belt clamping pressure adjustment process according to a second embodiment of the invention.

FIG. 3 shows a flowchart of a "belt clamping pressure adjustment process" applied to the thus configured present embodiment. The process is also periodically executed by the electronic control unit 23 while the vehicle is in motion.

When the process starts, the electronic control unit 23 determines in step S110 whether the steering angle of the vehicle is larger than or equal to a prescribed threshold angle α. Here, the threshold angle α is set to the minimum steering angle range within which torque is distributed to the rear wheels 21 as the amount of differential motion between the right and left wheels 16 increases. Therefore, if the steering angle is larger than or equal to the threshold angle α, engine torque is distributed to the rear wheels 21.

Here, when the steering angle is below the threshold angle α (S110: NO), the electronic control unit 23 directly ends the current process. On the other hand, if the steering angle is larger than or equal to the threshold angle α and, therefore, torque is being distributed to the rear wheels 21 (S110: YES), the electronic control unit 23 calculates the amount by which to increase the sheave pressure in step S20, and then increases the belt clamping pressures in step S30.

With the above described control device for a belt-type continuously variable transmission according to the present embodiment, in addition to the advantageous effects described in the above (1) to (4), the following advantageous effect may be further obtained.

(5) In the present embodiment, the electronic control unit 23 determines, based on a detected steering angle of the four-wheel drive vehicle, whether engine torque is being distributed to the rear wheel 21. Because there is a correlation between the steering angle and the distribution of torque, it is possible to substantially acquire the distribution of torque between the wheels from the steering angle. Thus, as in the above configuration, based on the detected steering angle of the four-wheel drive vehicle as well, it is possible to determine the distribution of torque between the front and rear wheels. Then, the belt clamping pressures are adjusted based on the detected steering angle, it is possible to effectively suppress muffled noise due to resonance with vibrations of the belt spans in the belt-type continuously variable transmission 12.

Next, a specific control device for a belt-type continuously variable transmission according to a third embodiment of the invention will be described focusing on the difference from the preceding embodiment with further reference to FIG. 4. In the above described four-wheel drive vehicle, usually, two-wheel drive is carried out only using the main driving wheels, and four-wheel drive is carried out as needed. Some of the four-wheel drive vehicles allow a driver to arbitrarily select a full-time four-wheel drive mode. In the full-time four-wheel drive mode, by operating a fixed switch placed in a passenger compartment, torque may be distributed between the front and rear wheels is fixed to regularly run in four-wheel drive. In such four-wheel drive vehicles, it is possible to determine whether engine torque is being distributed to the rear wheels 21, which may serve as auxiliary wheels, based on the operating status of the fixed switch. That is, if the fixed switch is turned on to select the full-time four-wheel drive mode, it may be determined that engine torque will be distributed to the rear wheels 21. Then, in the present embodiment, whether torque is being distributed to the rear wheels 21 is determined based on an operating status of the fixed switch. Specifically, if the fixed switch is turned on, it is determined that torque will be distributed to the rear wheels 21, thereby the belt clamping pressure of the belt-type continuously variable transmission 12 will be adjusted.

Note that, even if the fixed switch is turned off, engine torque may be distributed also to the rear wheels 21 depending on a situation. However, toque is not distributed to the rear wheels 21 in this case. If, as a result, a vehicle component resonates to generate muffled noise, the muffled noise is temporary. Therefore, the above case is not regarded as a problem here.

Figure 4:
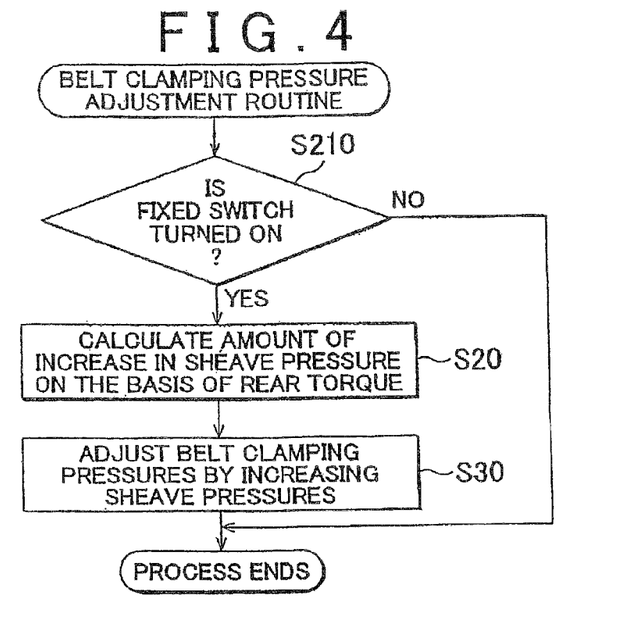
FIG. 4 is a flowchart of a belt clamping pressure adjustment process according to a third embodiment of the invention.

FIG. 4 shows a flowchart of a "belt clamping pressure adjustment process" applied to the thus configured present embodiment. The process is also periodically executed by the electronic control unit 23 as while the vehicle is moving. Note that, here, the full-time four-wheel drive mode is selected when the fixed switch is turned on, and the part-time four-wheel drive mode is selected when the fixed switch is turned off.

When the process starts, the electronic control unit 23 determines in step S210 whether the fixed switch is turned on. Here, if the fixed switch is turned off (S210: NO), the electronic control unit 23 directly ends current process. On the other hand, if the fixed switch is turned on (S210: YES), the electronic control unit 23 calculates the amount by which to increase the sheave pressure in step S20, and then increases the belt clamping pressures in step S30.

With the above described control device for a belt-type continuously variable transmission according to the present embodiment, in addition to the advantageous effects described in the above (1) to (4), the following advantageous effect is further obtained.

(6) In the present embodiment, the electronic control unit 23 determines, based on an operating status of the fixed switch for selecting the operational mode of the vehicle to four-wheel drive, whether torque is being distributed to the rear wheels 21. In this way, based on the operating status of the fixed switch as well, it is possible to estimate the distribution of torque between the front and rear wheels. Then, the belt clamping pressures are adjusted based on the monitored operating status. Thus, it is possible to effectively suppress muffled noise due to resonance with vibrations of the belt spans in the belt-type continuously variable transmission 12.

Next, a specific control device for a belt-type continuously variable transmission according to a fourth embodiment of the invention will be described focusing on the difference from the preceding embodiment with further reference to FIG. 5. When the pulley ratio is changed to vary the speed ratio γ of the belt-type continuously variable transmission 12, the length over which the belt 15 is in contact with the pulleys varies and, therefore, the length L of each of the belt spans also varies. Here, as indicated by the mathematical expression (1), as the length L of each belt string portion varies, the frequency f of belt span vibrations also varies. Therefore, resonance of a vehicle component due to belt span vibrations may or may not occur depending on the speed ratio selected in the belt-type continuously variable transmission 12. That is, even if the resonance of a vehicle component occurs as torque is distributed to the rear wheels 21 at a specific speed ratio, resonance of a vehicle component may not occur at another speed ratio. Then, in the present embodiment, the belt clamping pressures are adjusted based on the torque distributed between the front and rear wheels only when the speed ratio γ of the belt-type continuously variable transmission 12 falls within a specific range in which a vehicle component resonates due to belt span.

Figure 5:
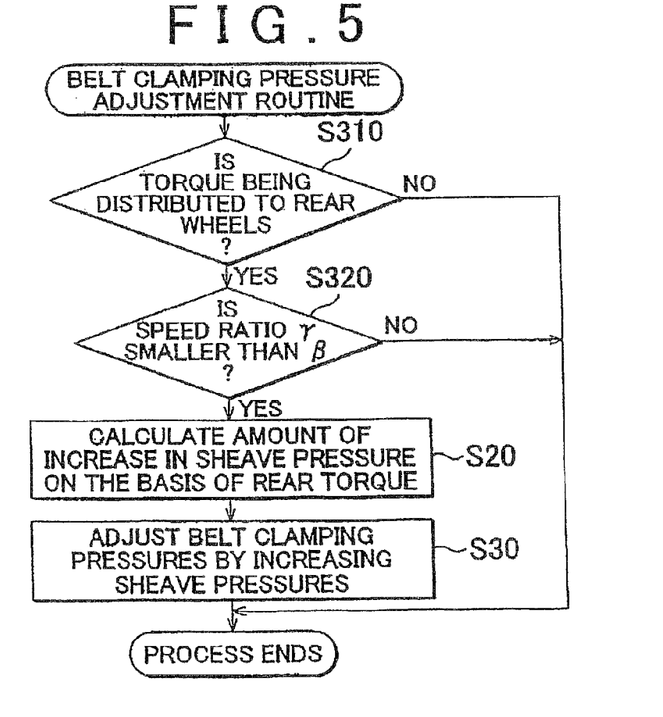
FIG. 5 is a flowchart that shows the steps of a belt clamping pressure adjustment process according to a fourth embodiment of the invention.

FIG. 5 shows a flowchart of a "belt clamping pressure adjustment process" applied to the thus configured present embodiment. The electronic control unit 23 also periodically executes the process when the vehicle is moving. Note that, here, it is assumed that resonance of vehicle components due to belt span vibrations are likely to occur only when the speed ratio γ of the belt-type continuously variable transmission 12 is below a prescribed ratio β.

When the process starts, the electronic control unit 23 determines in step S310 whether torque is being distributed to the rear wheels 21. Here, whether torque is being distributed to the rear wheels 21 may be determined by any one of a method based on a detected rear torque, a method based on a detected steering angle and a method based on an operating status of the fixed switch as described above, or a combination of these methods. Here, if torque is not being distributed to the rear wheels 21 (S310: NO), the electronic control unit 23 directly ends the current process.

On the other hand, if torque is being distributed to the rear wheels 21 (S310: YES), the electronic control unit 23 determines in step S320 whether the speed ratio γ of the belt-type continuously variable transmission 12 is below the prescribed ratio β. Here, if the speed ratio γ is above or equal to the prescribed ratio β (S320: NO), the electronic control unit 23 ends the current process. On the other hand, if the speed ratio γ is below the prescribed ratio β and in a situation where a vehicle component may resonate due to belt span vibrations unless the belt clamping pressures are adjusted (S320: YES), the electronic control unit 23 calculates the amount by which to increase the sheave pressure in step S20, and then increases the belt clamping pressures in step S30.

With the above described control device for a belt-type continuously variable transmission according to the present embodiment, in addition to the advantageous effects described in the above (1) to (4), the following advantageous effect may be further obtained.

(7) In the present embodiment, the electronic control unit 23 adjusts the belt clamping pressures based on torque distributed between the front and rear wheels only when the speed ratio γ of the belt-type continuously variable transmission 12 falls within the prescribed range. Thus, when the speed ratio γ of the belt-type continuously variable transmission 12 falls within the range in which a vehicle component resonates due to belt span vibrations, the belt clamping pressures is adjusted. Hence, it is possible to avoid unnecessary adjustment of the belt clamping pressures to further suppress resonance of vehicle components due to belt span vibrations.

Next, a specific control device for a belt-type continuously variable transmission according to a fifth embodiment of the invention will be described focusing on the difference from the preceding embodiment with further reference to FIG. 6. Some vehicles equipped with a belt-type continuously variable transmission 12 employ a sequential-shift mode as a speed shift mode. The sequential-shift mode allows speed shifting like a manual transmission vehicle. In such a sequential mode, shift control is executed so that the speed ratio γ of the belt-type continuously variable transmission 12 is fixed to the speed ratio corresponding to a speed selected through a driver's operation.

Here, the frequency of belt span vibrations that occur in the belt spans varies depending on a speed ratio γ of the belt-type continuously variable transmission 12 as described above. Thus, resonance of a vehicle component due to belt span vibrations may occur in a specific speed in the sequential mode. Then, in the present embodiment, when in the sequential mode, the belt clamping pressures are adjusted based on the torque distributed between the front and rear wheels only when the speed selected at that time is a specific speed in which a vehicle component may resonate due to belt span vibrations. For example, if the resonance of a vehicle component due to belt span vibrations occurs based on the torque distributed to the rear wheels 21 in a LOW speed unless the belt clamping pressures of the belt-type continuously variable transmission 12 are adjusted, and such probability does not exist in the other speeds, the belt clamping pressure is adjusted only when the LOW speed is selected.

Figure 6:
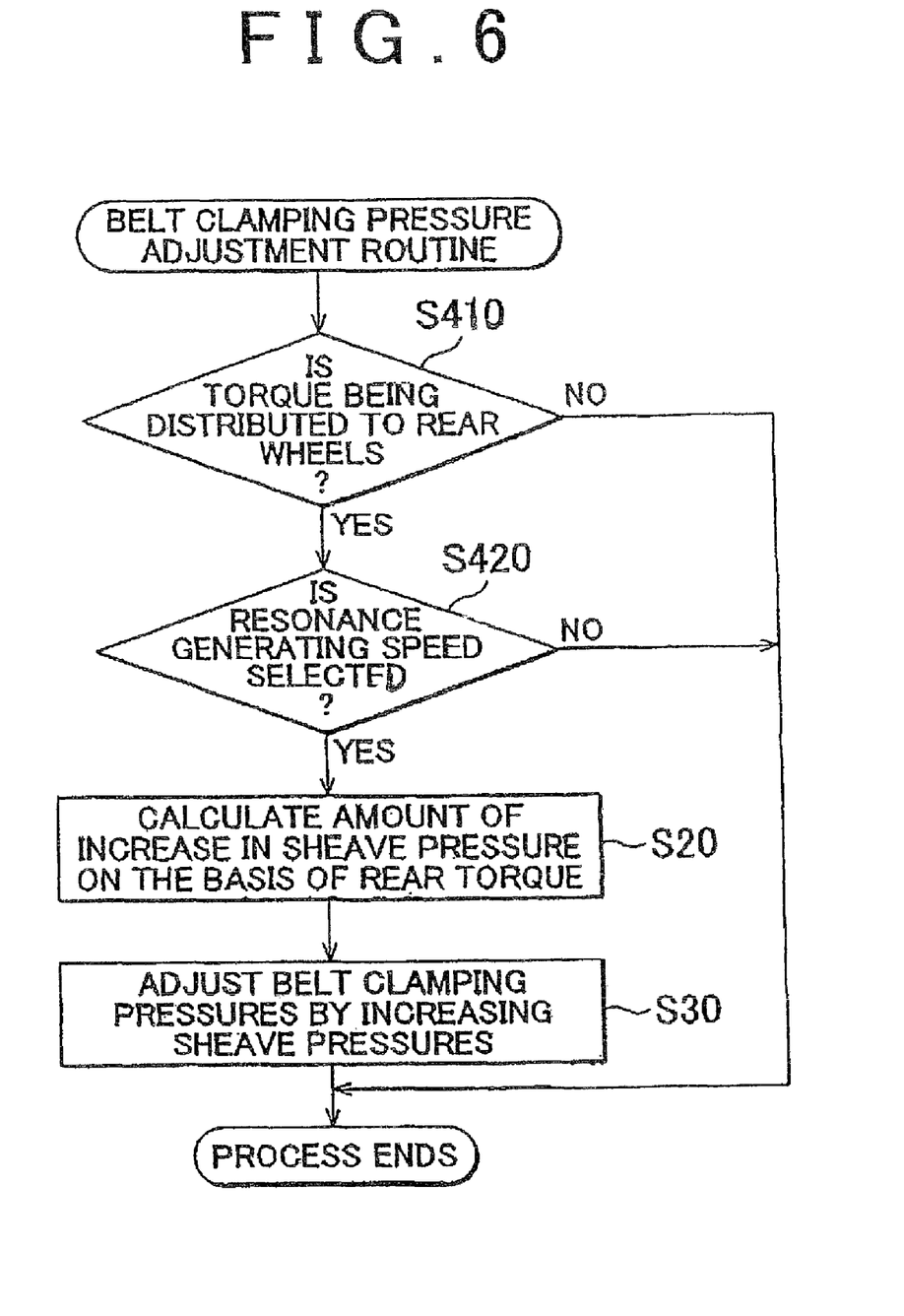
FIG. 6 is a flowchart that shows the steps of a belt clamping pressure adjustment process according to a fifth embodiment of the invention.

FIG. 6 shows a flowchart of a "belt clamping pressure adjustment process" applied to the thus configured present embodiment. The process is periodically executed by the electronic control unit 23 when the sequential shift mode is selected as the speed shift mode of the transmission.

When the process starts, the electronic control unit 23 determines in step S410 whether torque is being distributed to the rear wheels 21. Here, whether torque is being distributed to the rear wheels 21 may be determined by any one of a method based on a detected rear torque, a method based on a detected steering angle and a method based on an operating status of the fixed switch as described above, or a combination of those methods. Here, if torque is not being distributed to the rear wheels 21 (S410: NO), the electronic control unit 23 directly ends the current process.

On the other hand, if torque is being distributed to the rear wheels 21 (S410: YES), the electronic control unit 23 determines in step S420 whether the currently selected speed causes resonance of a vehicle component due to belt span vibrations (resonance generating speed) unless the speed is shifted. Here, when the resonance generating speed is not currently selected (S420: NO), the electronic control unit 23 directly ends the current process. On the other hand, if the resonance generating speed is selected and in a situation where a vehicle component resonates due to belt span vibrations unless the belt clamping pressures are adjusted (S420: YES), the electronic control unit 23 calculates the amount by which to increase the sheave pressure in step S20, and then increases the belt clamping pressures in step S30.

With the control device for a belt-type continuously variable transmission according to the present embodiment above, in addition to the advantageous effects described in the above (1) to (4), the following advantageous effect may be also be obtained.

(8) In the present embodiment, the electronic control unit 23 adjusts the belt clamping pressures based on torque distributed between the front and rear wheels only when a predetermined speed is selected in a sequential mode in which the speed ratio γ of the belt-type continuously variable transmission 12 is fixed to the speed ratio corresponding to a speed selected through a driver's operation. Thus, the belt clamping pressures is adjusted only when the speed is set in a specific speed in which a vehicle component resonates due to belt span vibrations. Hence, it is possible to avoid unnecessary adjustment of the belt clamping pressures to further effectively suppress resonance of a vehicle component due to belt span vibrations.

Next, a control device for a belt-type continuously variable transmission according to a sixth embodiment of the invention will be described focusing on the difference from the fifth embodiment. In the above described embodiments, the amount of increase in sheave pressure for adjusting the belt clamping pressures, that is, the amount of adjustment in belt clamping pressure, is determined based on the magnitude of torque distributed to the rear wheels 21 (rear torque), which serve as the auxiliary driving wheels. However, some vehicles do not have a monitor that monitors the magnitude of rear torque, and, in this case, the amount of adjustment in belt clamping pressure cannot be determined directly based on the rear torque. However, the magnitude of rear torque may be estimated with considerable accuracy based on the input torque to the electronically controlled coupling 20 and the speed ratio γ of the belt-type continuously variable transmission 12. Thus, even if the magnitude of the rear torque is not monitored, the amount of adjustment in belt clamping pressure is determined based on the input torque and the speed ratio γ, thus making it possible to adjust the belt clamping pressures in a similar manner. Note that in addition to the direct detection of the input torque of the electronically controlled coupling 20, it may also be calculated from the torque generated by the engine 10 and the speed ratio γ.

Note that the above described embodiments may be modified into the following alternative embodiments.

In the first to fifth embodiments, the torque of the secondary pulley 14 is detected as an output torque of the belt-type continuously variable transmission 12, and the detected torque is used as an index of the magnitude of rear torque to adjust the belt clamping pressures. However, the output torque of the belt-type continuously variable transmission 12 may be obtained from the torque of any rotating element arranged in a portion from the secondary pulley 14 to the electronically controlled coupling 20 within the torque transmission path from the engine 10 to the rear wheels 21. Then, instead of the secondary pulley 14, the detected torque of that rotating element may be regarded as the output torque of the belt-type continuously variable transmission 12, and then the detected torque may be used as an index value of the magnitude of the rear torque for adjusting the belt clamping pressures. In addition, when the torque of a rotating element (the axle of the rear wheels 21, or the like) downstream of the electronically controlled coupling 20 in the torque transmission path is detected, it is possible to directly detect the rear torque. Thus, it is also possible to adjust the belt clamping pressures by directly detecting the rear torque.

In the above-described embodiments, the belt clamping pressures of the belt-type continuously variable transmission 12 are adjusted by increasing the belt clamping pressures. However, the frequency of belt span vibrations may also be changed by decreasing the belt clamping pressure. Thus, it is also possible to suppress resonance of vehicle components due to belt span vibrations by decreasing the belt clamping pressures. For example, when there is no margin for increasing the belt clamping pressures any more, or when the frequency of belt span vibrations at which resonance of a vehicle component is avoidable is easily obtained by decreasing the belt clamping pressures as compared with increasing the belt clamping pressures, muffled noise due to resonance of a vehicle component with belt span vibrations may be suppressed by decreasing the belt clamping pressure.

In the above described embodiments, the belt clamping pressures of the belt-type continuously variable transmission 12 are adjusted as torque is distributed to the rear wheels 21, which serve as the auxiliary driving wheels. However, when a vehicle component does not resonate due to belt span vibrations until the rear torque is larger than a certain value, the belt clamping pressures may be adjusted when the rear torque is larger than or equal to a predetermined value.

In the first to fourth embodiments, the amount of adjustment in belt clamping pressure is determined based on the detected magnitude of the rear torque. Note that the magnitude of the rear torque is adjusted by the electronically controlled coupling 20. Thus, even though the magnitude of the rear torque is directly detected, it is possible to determine the magnitude of the rear torque from a control command value sent to the electronically controlled coupling 20. Thus, when the amount of adjustment in belt clamping pressure is determined based on the control command value to the electronically controlled coupling 20 as well, it is possible to adjust the belt clamping pressure in a similar manner.

In the above-described embodiments, the amount of adjustment in belt clamping pressure is determined based on the detected or estimated magnitude of the rear torque. Note that, as described above, the frequency of belt span vibrations that occur in the belt spans of the belt-type continuously variable transmission 12 varies depending on a speed ratio γ. Thus, an appropriate amount of adjustment in belt clamping pressure, by which resonance of a vehicle component due to belt span vibrations is avoidable, may vary depending on a speed ratio γ. Then, in this case, the amount of adjustment in belt clamping pressure is determined based on the speed ratio γ or, where necessary, based on the speed ratio γ and a detected or estimated rear torque. Thus, it is possible to further effectively suppress resonance of vehicle components due to belt span vibrations.

In the above described embodiments, an amount of adjustment in belt clamping pressure is determined based on the magnitude of the rear torque, or the like. However, when the amount of adjustment in belt clamping pressure, by which resonance of a vehicle component due to belt span vibrations is sufficiently suppressed, does not depend on the variation in rear torque and hardly changes, the adjusted amount may always be set to the same fixed value.

In the described embodiments, the above description refers to the example in which the aspects of the invention are implemented in the belt-type continuously variable transmission 12 mounted on the four-wheel drive vehicle in which the front wheels 16 serve as the main driving wheels and the rear wheels 21 serve as the auxiliary driving wheels. Alternatively, however, the control device according to the aspects of the invention may also be similarly applied to a belt-type continuously variable transmission mounted on a four-wheel drive vehicle in which the rear wheels serve as the main driving wheels and the front wheels serve as the auxiliary driving wheels.

In the described embodiments, the above description refers to the example in which the aspects of the invention are implemented in the belt-type continuously variable transmission 12 mounted in a four-wheel drive vehicle that is able to switch between two-wheel drive and four-wheel drive. However, even in full-time four-wheel drive vehicles that regularly run in four-wheel drive as well but varies torque distributed between the front and rear wheels, the portions of the vehicle in which belt span vibrations propagate may also change as the distribution of torque changes. For example, even components that hardly receive the influence of belt span vibrations when the torque distribution to the rear wheels is small may receive nonnegligible influence from belt span vibrations as the torque distribution to the rear wheels increases. Thus, the same problem may arise even in full-time four-wheel drive vehicles. By applying the aspects of the invention in a full-time four-wheel drive vehicle, it is possible to suppress muffled noise due to vibrations of the belt spans in the belt-type continuously variable transmission.

What is claimed is:

1. A control device for a belt-type continuously variable transmission that is mounted on a four-wheel drive vehicle, which variably distributes torque between front and rear wheels, and that changes a winding radii of a belt wound around an input-side pulley and an output-side pulley to shift speeds, the control device comprising:
   a clamping pressure adjusting device that adjusts belt clamping pressures of the pulleys in accordance with a torque distribution determined based on between the front and rear wheels,
      wherein the clamping pressure control device includes a sensor that determines the distribution of torque between the front and rear wheels based on a detected steering angle of the four-wheel drive vehicle.

2. The control device according to claim 1, wherein
the four-wheel drive vehicle switches between operating in a two wheel drive mode, in which torque is distributed only to main driving wheels and operating in a four-wheel drive, in which torque is distributed to both the main driving wheels and auxiliary driving wheels, and
the clamping pressure adjusting device adjusts the belt clamping pressures as torque is distributed to the auxiliary driving wheels.

3. The control device according to claim 2, wherein
the clamping pressure adjusting device determines an amount by which to adjust the belt clamping pressure based on a magnitude of the torque transmitted to the auxiliary driving wheels.

4. The control device according to claim 2, wherein
the clamping pressure adjusting device determines an amount by which to adjust the belt clamping pressure based on an input torque of an electronically controlled coupling, which is able to adjust a torque distribution ratio to the auxiliary driving wheels, and a speed ratio of the belt-type continuously variable transmission.

5. The control device according to claim 1, wherein
the clamping pressure adjusting device increases the belt clamping pressures.

6. The control device according to claim 1, wherein
the clamping pressure adjusting device decreases the belt clamping pressures.

7. The control device according to claim 1, wherein
the four-wheel drive vehicle switches between operating in a two wheel drive mode, in which torque is distributed only to main driving wheels and operating in a four-wheel drive, in which torque is distributed to both the main driving wheels and auxiliary driving wheels, and
the clamping pressure adjusting device determines the distribution of torque between the front and rear wheels based on an operating status of a switch for setting the four-wheel drive vehicle to operate in four-wheel drive mode.

8. The control device according to claim 1, wherein
the clamping pressure adjusting device adjusts the belt clamping pressures based on torque distributed between the front and rear wheels only when a speed ratio of the belt-type continuously variable transmission falls within a prescribed speed ratio range.

9. The control device according to claim 1, wherein
the clamping pressure adjusting device adjusts the belt clamping pressures based on the distribution of torque between the front and rear wheels only if a predetermined speed is selected in a sequential mode in which a speed ratio of the belt-type continuously variable transmission is fixed to a speed ratio corresponding to a speed selected through a driver's operation.

10. The control device according to claim 1, wherein
the clamping pressure adjusting device increases or decreases the belt clamping pressures so that vibrational frequency of belt span vibrations of the belt falls within a range that excludes a predetermined resonance frequency of a vehicle component.

11. A control method for a belt-type continuously variable transmission that is mounted on a four-wheel drive vehicle, which variably distributes torque between front and rear wheels, and that changes winding radii of a belt on two input-side and output-side pulleys to shift speeds, the belt being wound around the two pulleys, the control method comprising:
   adjusting belt clamping pressures of the pulleys by increasing or decreasing the belt clamping pressures based on torque distributed between the front and rear wheels; and
   determining the distribution of torque between the front and rear wheels based on a detected steering angle of the four-wheel drive vehicle.

12. A control device for a belt-type continuously variable transmission that is mounted on a four-wheel drive vehicle, which variably distributes torque between front and rear wheels, and that changes a winding radii of a belt wound around an input-side pulley and an output-side pulley to shift speeds, the control device comprising:
   a clamping pressure adjusting device that adjusts belt clamping pressures of the pulleys in accordance with a torque distribution determined based on between the front and rear wheels, wherein the clamping pressure adjusting device increases or decreases the belt clamping pressures so that vibrational frequency of belt span vibrations of the belt falls within a range that excludes a predetermined resonance frequency of a vehicle component.

* * * * *